US006768321B2

United States Patent
Wain et al.

(10) Patent No.: US 6,768,321 B2
(45) Date of Patent: Jul. 27, 2004

(54) COMPONENT POSITION INDICATING APPARATUS

(75) Inventors: Robert Edwin Wain, Burton-on-Trent (GB); Adrian Robert Noyes, Uttoxeter (GB)

(73) Assignee: Ctex Seat Comfort Limited, Burton on Trent (GB)

( * ) Notice: Subject to any disclaimer, the term of this patent is extended or adjusted under 35 U.S.C. 154(b) by 16 days.

(21) Appl. No.: 10/342,939

(22) Filed: Jan. 15, 2003

(65) Prior Publication Data

US 2003/0136443 A1 Jul. 24, 2003

(30) Foreign Application Priority Data

Jan. 16, 2002 (GB) ............................................. 0200949

(51) Int. Cl.[7] ............................................. G01R 27/08
(52) U.S. Cl. ..................... 324/699; 297/284.6; 242/563
(58) Field of Search ................................ 324/207, 513, 324/699; 297/284.4, 284.6; 242/563; 701/49

(56) References Cited

U.S. PATENT DOCUMENTS

| 3,252,085 | A | * | 5/1966 | Whitekettle, Jr. ........... 324/513 |
| 3,812,589 | A | | 5/1974 | Schultheis |
| 6,499,225 | B1 | * | 12/2002 | Steinich ........................ 33/756 |
| 6,652,028 | B2 | * | 11/2003 | McMillen ................ 297/284.4 |
| 6,676,214 | B2 | * | 1/2004 | McMillen et al. ........ 297/284.1 |

FOREIGN PATENT DOCUMENTS

| EP | 0174914 | 3/1986 |
| EP | 0325787 | 8/1989 |
| EP | 0597529 | 5/1994 |
| EP | 1013594 | 6/2000 |
| EP | 1014031 | 6/2000 |

* cited by examiner

Primary Examiner—N. Le
Assistant Examiner—Walter Benson
(74) Attorney, Agent, or Firm—Reising, Ethington, Barnes, Kisselle, P.C.

(57) ABSTRACT

A component position indicating system which provides an indication when a first component is at the same position relative to a second component as it was at some historical reference time has a cable (11) fixed to the first component and a sheath (6) which surrounds part of the cable (11) and is connected to the second component. In this way relative movement between the first and second components produces movement of the cable within the sheath. One end of the cable (6) is wound around a cable drum (7) which is freely rotatably mounted in a chassis (2) such that movement of the cable (11) within the sheath (6) causes cable to wind onto or off of the drum (7), causing rotation of the drum (7) in the process. Sensing means senses the resulting movement of the drum (7) and records an output characteristic indicative of the position of the drum (7) relative to the chassis (2) so as to enable a particular relative position between said first and second components to be identified and accurately reproduced.

21 Claims, 3 Drawing Sheets

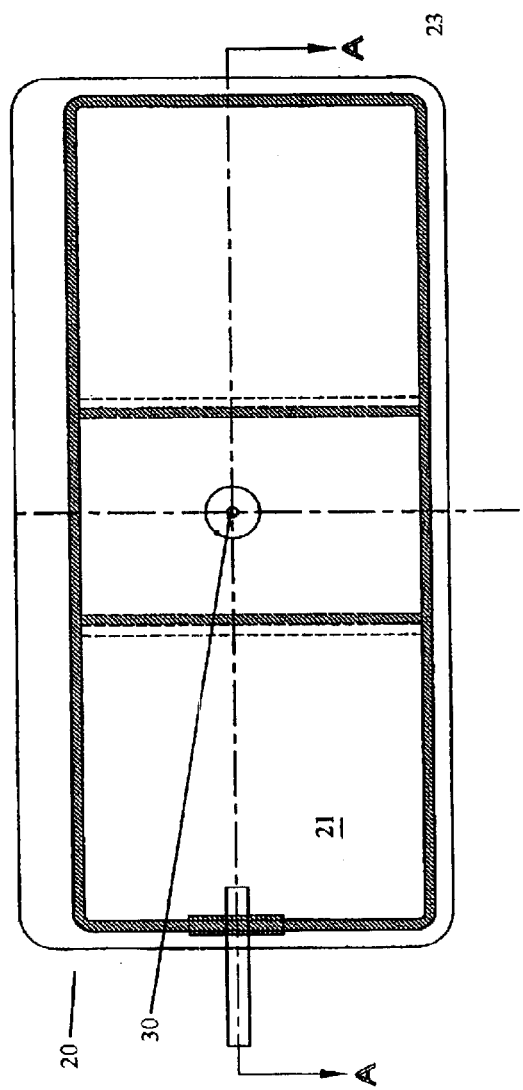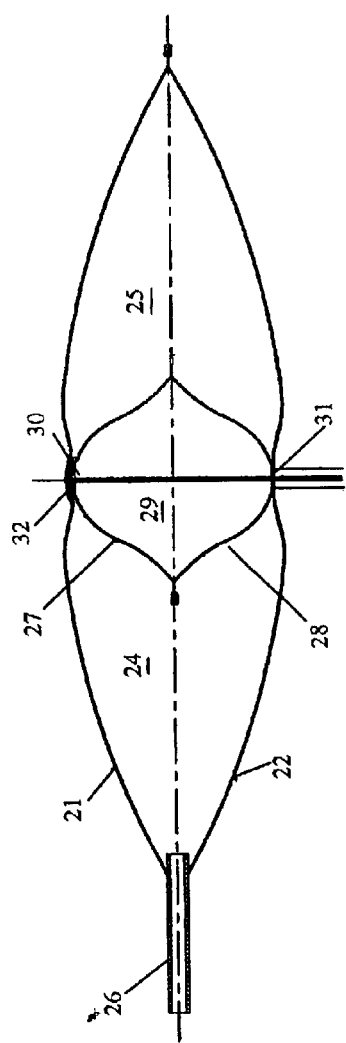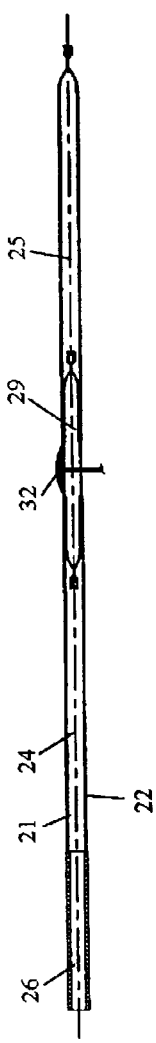

COMPONENT POSITION INDICATING APPARATUS

This invention relates to a component position indicating apparatus, that is to say apparatus which may be used to indicate the position of a component. More particularly, the invention provides apparatus which will indicate whether a first component is in the same position relative to a second component as the position which the first component was in relative to the second component at some historical time. The preferred embodiment of the invention also provides a real time indication as to whether the first component is nearer to or further from the second component than it was at the historical reference time. The preferred embodiment of the invention may accordingly be used as part of the control system for returning the first and second components to the same relative position as they were in at the historical reference time.

There are many instances when it is desirable to bring two components to a position relative to each other which is the same as the position which the components had previously adopted relative to each other. This situation arises whenever the relative position of the two components is first adjusted to produce some particular desired effect, and it is subsequently necessary to re-position the components to produce the same desired effect. One particular example of such a requirement is in the case of inflatable structures where the structure may, at some point, be inflated to produce a particular configuration and in which it is desired subsequently to re-create the same relative position of the components so as to re-produce the same configuration. This requirement may exist, for example, in an inflatable support element of a seat, for example a vehicle seat. In this example a driver may adjust the degree of inflation of an inflatable element (for example an inflatable lumbar support) to optimize comfort of a seat for his personal circumstances. If the vehicle is subsequently not used for some time, and as a result inflation pressure leaks from the lumbar support, it is desirable to have a mechanism which will automatically re-establish the components in to the same relative position as that in which they were in when last adjusted by the driver in question. A similar requirement may exist, for example, in relation to the angle of a seat back relative to a seat cushion. One driver may set this to a particularly desired value and it would be desirable to be able to re-set the angle to that desired value notwithstanding that an occasional user of the seat has altered the angle to suit his particular requirements.

Whilst the particularly preferred embodiments of the invention have been developed for use in connection with vehicle seats, it should be appreciated that the invention is of wide general applicability and may be used in many applications where it is desirable to re-establish the same relative position between two components as was present at some previous historical reference time.

In accordance with one aspect of the present invention a component position indicating apparatus for indicating when a first component is at the same position relative to a second component as it was at some historical reference time, comprising a cable connected to a first component, a sheath which surrounds part of the cable and is connected to the second component whereby relative movement between the first and the second components produces relative movement between the cable and the sheath, a chassis connected to the sheath, a cable drum rotatably mounted in the chassis, the cable being connected to the cable drum with some of the cable wrapped around the cable drum whereby linear movement of the cable relative to the cable sheath causes rotation of the cable drum within the chassis, and sensing means for providing an output characteristic of the position of the cable drum relative to the chassis.

According to one embodiment, a screw-threaded support is mounted on the chassis and the cable drum is screw threadedly mounted on the support whereby rotation of the cable drum results in linear movement of the cable drum relative to the chassis so that movement of the cable relative to the cable sheath causes rotation of the cable drum relative to the screw-threaded support.

Preferably, then, the sensor is a hall effect sensor which is acted upon by a magnet secured to the cable drum.

In use, as the first and second components move relative to each other, the resultant relative movement between the cable and the sheath cause rotation of the cable drum and a change in the linear relative positions of the cable drum and the sensor. The sensor will provide an output characteristic of the linear relative position of the sensor and the cable drum and hence characteristic of the relative positions of the first and second components.

In another preferred embodiment of the invention, the sensing means comprising a potentiometer the resistance of which varies with the angular position of the cable drum relative to the claims, in particular wherein said potentiometer comprises a pair of arcuate contact tracks which are radially spaced apart and which are concentric with the axis of rotation of the cable drum, the cable drum having an electrical contact mounted thereon which engages said contact tracks so as to cause an electrical short therebetween, said electrical contact sweeping along said contact tracks upon rotation of the cable drum so as to vary the position of the short between said tracks and hence to vary their resistance such that each angular position of the cable drum produces a unique resistance across the contact tracks. The contact tracks may be printed on a circuit board mounted on an endcap of the chassis with each contact track preferably subtending an arc about the axis of rotation of the cable drum of substantially 300 degrees.

This arrangement has the advantage that it offers greater accuracy due to the greater resolution which can be delivered with a variable resistor whilst being significantly cheaper than the linear system according to the first embodiment.

In a particularly preferred embodiment of the invention a memory is associated with the sensor so that when the first and second components have been adjusted to a particularly desired position, the memory may record the output of the sensor characteristic of this relative position. The sensor output which has been recorded serves as a datum value for future reference. If at some time in the future it is desired to re-position the first and second components so that they are in the same relative position as they were in at the moment when the sensor output was recorded, it is merely necessary to vary the position of the first and second components until the output of the sensor matches the value recorded in the memory.

Preferably, the characteristics of the sensor are such that the sensor output varies continuously and in the same sense as the first and second components move from one limit of their relative positions to the opposite limit of their relative positions. Accordingly, the sensor output in real time will either be less than or more than the recorded sensor value associated with a particular relative position. Under these circumstances, the output of the sensor may be used as part of a feedback mechanism to control an actuator so that the first and second components may be brought into the same relative position as the components were in when the output of the sensor was recorded.

It will be noted that the apparatus described above offers a number of distinct advantages. Firstly, in many applications no calibration of the apparatus is required. In this respect, the absolute output of the sensor is of no interest. All that the sensor is required to do is to provide an output which is characteristic to the relative positions of the first and second components in the particular assembly of which it forms part. When the first and second components have been brought to their required relative position (for example by running the inflation pump of an inflatable lumbar support), the output of the sensor corresponding to that relative position is recorded. This recorded value may then be used subsequently to re-position the components in the same relative position. Accordingly, all the variations associated with manufacturing tolerances of the components and the assembly thereof are irrelevant to operation of the device. A further advantage of the invention is that it is applicable to determining the relative position of any pair of components which can be connected respectively to a cable and a sheath to provide relative movement between the cable and the sheath as the first and second components move relative to each other. Thus, the invention is applicable to components which move linearly relative to each other and components which move angularly relative to each other.

It will be noted that the entire apparatus may be pre-assembled under factory conditions and supplied as a unit which can be installed merely by connecting the sheath to one of the components and the cable to the other of the components. In this connection, as noted above, no calibration of the device is necessary after the sheath and cable have been secured to their respective components and accordingly the assembly of the pre-formed apparatus and the components whose relative position is to be sensed can be carried out without a requirement for precision assembly techniques.

It should be noted that the term "cable" as used herein is intended to mean any flexible material of appropriate mechanical characteristics which may be used to transmit tensile force. The material may be a monofilament material or a woven or laid material and may be of metal or synthetic plastics composition depending on the nature of the components whose relative position is to be indicated.

It should further be noted that although, in the broadest context, the invention is concerned with a device which merely produces an indication of the relative position of two components, the device may be incorporated together with appropriate actuators and feedback arrangements to produce a control system for maintaining the position of one component relative to another at a pre-determined value. For example, the invention could be utilized in association with a pump and appropriate feedback control circuitry to maintain a component supported on an inflatable structure at a predetermined level as the load on the structure varies. This arrangement offers the advantage of offering a particularly effective inflation control system which may be used, for example to control a lumbar support in a vehicle seat. It also has the advantage that it does not require calibration and may also be used to control the maximum inflated position of an air cell, again without requiring a factory calibration of the upper limit on factory set up.

The present invention accordingly further provides an inflation control system comprising an air cell having upper and lower sheets which define a first internal chamber, a second chamber located within and sealed off from said first chamber, the top of said second chamber being connected to the upper sheet and the bottom of said second chamber being connected to the lower sheet of said air cell, and said second chamber having upper and lower openings which connect said second chamber to the atmosphere, a cable which is firmly attached to the upper sheet of the bladder at said upper opening and which extends through said second chamber, out of said lower opening and connects to a component position indicating apparatus according to the invention, said cable being freely translatable through said lower opening, and inflation means connected to said air cell for varying the pressure within said first chamber, wherein upon inflation of the first chamber, the upper opening of the second chamber moves away from the lower opening, drawing said cable with it, said movement of the cable being detected by the position indicating apparatus.

The invention will be better understood from the following description of a some embodiments thereof, given by way of example only, reference being had to the accompanying drawings wherein:

FIG. 7 is a plan view of a bladder the inflation of which may be controlled by the apparatus of FIGS. 1 to 6;

FIG. 8 shows the bladder of FIG. 7 in its fully inflated condition; and

FIG. 9 shows the bladder of FIG. 7 in its deflated condition.

Figure 2:
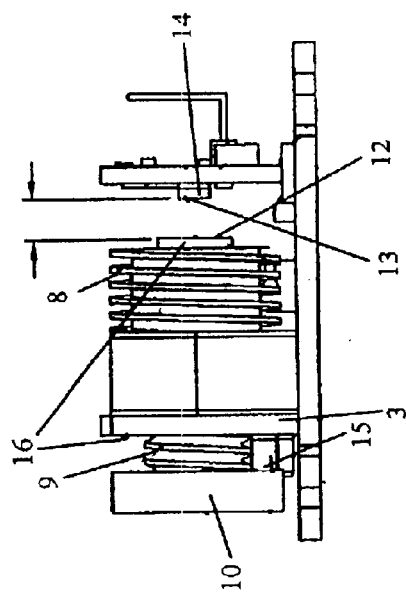
FIG. 2 is a side view of the chassis and chassis mounted components of the apparatus of FIG. 1 with the components in one extreme position.
Figure 1:
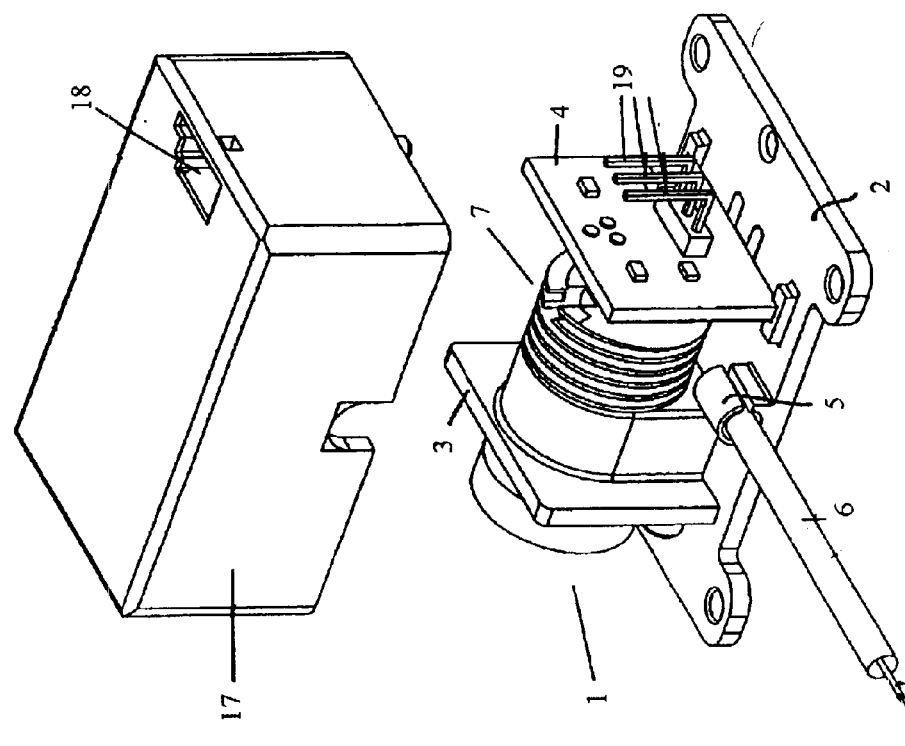
FIG. 1 illustrates schematically and in perspective an embodiment of the present invention.

Referring firstly to FIGS. 1 and 2, the illustrated apparatus 1 comprises a chassis 2 on which is mounted a bracket 3 and a circuit board 4. The chassis 2 includes a clip 5 which secures to the chassis a sheath 6 so as to prevent relative movement between the sheath and the chassis.

The bracket 3 includes a screw-threaded aperture and accordingly forms a screw-threaded support on which a cable drum assembly 7 is mounted. The cable drum assembly 7 comprises a cable drum 8 mounted on a screw-threaded stud 9 which is in screw-threaded engagement with the aperture in the bracket 3. A spring assembly 10 acts on the screw-threaded member 9 to apply a rotational bias which tends to rotate the cable drum assembly in a sense to wind onto the cable drum assembly a cable 11 which works within the sheath 6. In the relative position of the components illustrated in FIG. 2 the cable drum assembly 7 is at its maximum leftward position, that is the distance "X" between the end face 12 of the cable drum assembly and the end face 13 of a sensor 14 is at its maximum. If tension on the cable 11 is released the spring will rotate the cable drum assembly relative to the bracket to move the cable drum assembly to the right as viewed in FIG. 2 until the end face 15 of the spring assembly engages the end face 16 of the bracket 3. When this happens the gap X will be at a minimum. This configuration of the components is illustrated in FIG. 3.

Figure 3:
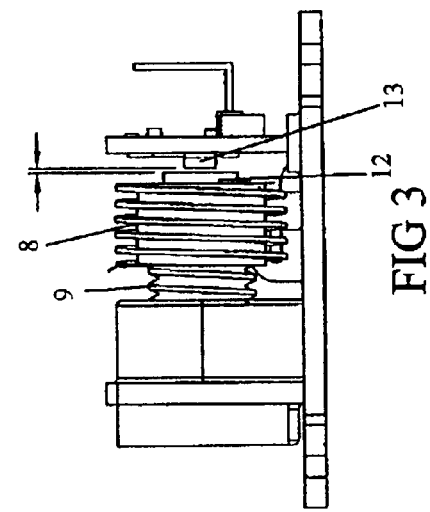
FIG. 3 is a side view of the chassis and chassis mounted components of the apparatus of FIG. 1 with the components in other extreme position.

It will be noted from the above description that as the cable moves relative to the sheath the cable drum assembly will be rotated so that it lies at some point between the extreme positions illustrated in FIGS. 2 and 3 depending on the position of the cable 11 relative to the sheath 6. The sensor 14 provides an output in real time which is indicative of the displacement between the face 12 of the cable drum assembly and the face 13 of the sensor. Preferably, the output of the sensor increases continuously or decreases continuously (according to the nature of the sensor) as the components move from the extreme position illustrated in FIG. 2 to the extreme position illustrated in FIG. 3. As a result, the output of the sensor at any particular time will be characteristic of the size of the gap X at that time. If this value is recorded for some particular value of the separation X it will be possible subsequently, by comparing the output of the sensor 14 with the recorded value, to determine whether or not the value of the gap X for the time being is greater than or less than the value which is associated with the recorded output of the sensor 14. Accordingly, by using appropriate control circuitry the output of the sensor 14 may control positioning apparatus so as to re-establish the relative position of the faces 12 and 13 to the value associated with the recorded output of the sensor 14.

In this embodiment of the invention illustrated the surface 12 is provided by the end surface of a magnet 16 which is part of the cable drum assembly, and the sensor 14 is a hall effect sensor the output of which depends on the strength of the magnetic field generated at the sensor by the magnet 16.

In use, once the components thus far described have been assembled a cover 17 is secured to the chassis 2 to enclose the bracket 3, circuit board 4 and cable drum assembly 7. Preferably, the cover 17 provides a socket 18 which will allow a pre-formed plug to be inserted to form appropriate electrical connections with the output conductors 19 of the circuit board 4.

Figure 5:
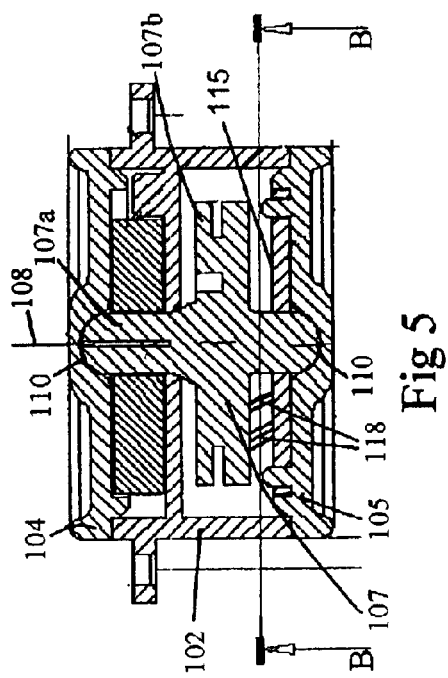
FIG. 5 is a sectional view on line A—A–through the body of the apparatus of FIG. 4.
Figure 6:
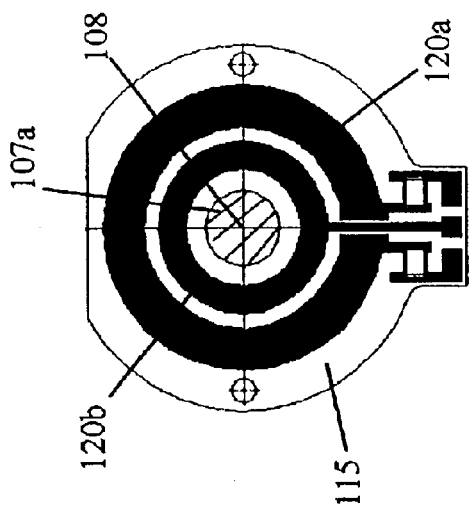
FIG. 6 is a section view on line B—B of FIG. 5.
Figure 4:
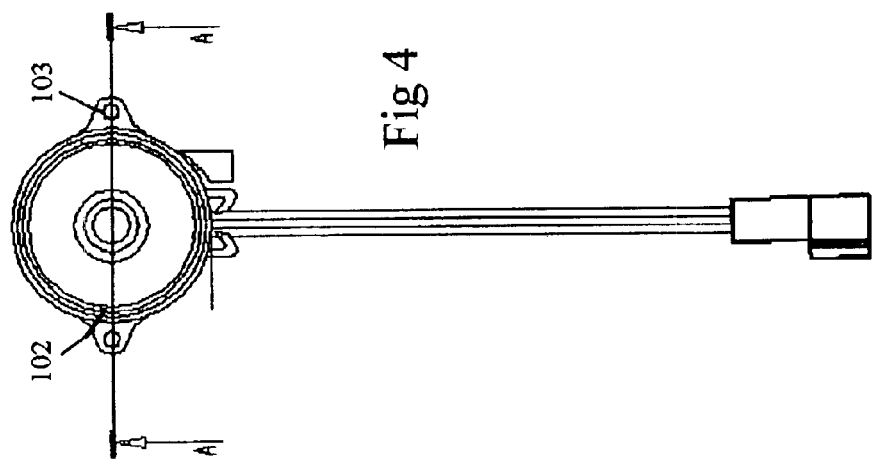
FIG. 4 is a schematic view of a second embodiment of a component portion indicating apparatus of the invention.

FIGS. 4 to 6 of the drawings illustrate an alternative embodiment of the component position indicating apparatus of the invention. The apparatus comprises a cylindrical chassis 102 which has integrally formed brackets 103 for mounting the apparatus in position. Housed within the chassis 102 is a cable drum 107, which, in this embodiment, is formed as a bobbin composed of a longitudinal shaft 107a with a radially extending disk 107b carried thereon, the cable drum being mounted in the chassis with the shaft 107a aligned with the longitudinal axis 108 of the chassis 102.

As more clearly shown in FIG. 5, the ends of the chassis 102 are closed off by circular endcaps 104, 105, each of which has a central recess 110 formed in its inner surface for engaging an end of the shaft 107a of the bobbin so as centrally to located it within the chassis. The surface of each said recess 110 should be smoothed or in some way finished to facilitate the free rotation of the cable drum 107 within the chassis 102.

The outer circumferential surface of the disk portion 107b of the cable drum has a radial groove 111 formed therein and a torsional spring assembly 112 is provided in the chassis that acts on the cable drum 107 to apply a rotational bias thereto which tends to rotate the cable drum relative to the chassis in a sense to wind into the groove 111 a cable 113 which works within a sheath 114. A printed circuit board 115 is mounted on the lower endcap 105, the inner face of which directed towards the cable drum has a pair of concentric circular electrically conductive contact tracks 120a, 120b carried thereon, which tracks are spanned by a lightly sprung electrical wiper contacts 118 carried on the adjacent face of the disk 107b of the cable drum 107 so as to cause a short therebetween. The wiper contacts are aligned with the tracks 120a, 120b so as to give a light contact with the tracks as the cable drum 107 revolves. In this way, as the drum 107 rotates, the wiper contacts 118 will move along the tracks, changing the position of the short therebetween, which hence varies the effective electrical length of the tracks, and therefore also the resistance across the tracks. By applying a known voltage across the tracks and monitoring the output voltage, then, it is possible to track the relative rotation of the cable drum 107 within the chassis 102. For example, if a controlled voltage of 5 voltage DC is applied across the tracks 120a, 120b of the printed circuit board, the output voltage measured across the proximate ends of the tracks will depend on the rotational position of the wiper and would range from say 0.5 volts to 4.5 volts within a range of movement of the drum of 300 degrees. Suitable mechanical means may be utilised to limit the maximum range through which the drum may rotate.

The printed circuit resistor track diameter is preferably designed to give a substantially one to one movement ratio, which gives improved resolution. As with the embodiment of FIGS. 1 to 3, the sheath 114 is fixed to the chassis 102 by suitable means in order to prevent movement therebetween.

Turning now to FIGS. 7 to 9, one possible application of the apparatus of FIGS. 1–6 is illustrated. FIGS. 7–9 show inflatable bladder 20 which, in use, may be incorporated into a seat structure to provide for adjustable support in the area of the seat in which the bladder is located. Typically, bladders may be provided for allowing adjustment of lumbar support, or adjustment of support at other body locations. The bladder comprises sheets 21, 22 of suitable material which are sealed together along seal lines 23 to produce two closed but interconnected chambers 24, 25. A tube 26 is sealed between the sheets 21, 22 to allow an inflation fluid (usually air) to be forced into or allowed to bleed from the chambers 24, 25. In the illustrated device additional sheets of material 27, 28 are located between the sheets 21 and 22 and are bonded to the sheets 21, 22 and to each other to define a chamber 29 which is isolated from the chambers 24, 25 and is vented to atmosphere via openings 30, 31 located centrally in the upper and lower faces of the bladder. The effect of this arrangement is that the bladder may be inflated by the addition of air through the tube 26 to increase the pressure in the chambers 24, 25. Although this will increase the volume of the chamber 29, because the chamber 29 is connected to atmosphere and is isolated from the chambers 24, 25 the pressure within the chamber 29 will remain at ambient. In FIG. 5 the bladder 20 is shown in its fully inflated condition and in FIG. 6 it is shown in its fully deflated condition.

In use, the bladder 20 is connected to the apparatus of FIGS. 1–3. To this end, the cable is passed through the chamber 29 and is anchored to a retaining washer 32. The sheath abuts the lower face of the bladder around the hole 31. The exact mechanism by which the cable is secured to the washer 32 is not critical. To ensure the correct relationship between the position of the cable drum assembly 7 and the inflation state of the bladder the cable may be secured to the washer when the bladder is fully deflated and the cable is substantially all wound onto the cable drum (i.e. the cable drum is at the position shown in FIG. 3). With the cable drum in this position the cable may be threaded through the apertures 31 and 32 and the deflated bladder offered up to bring the sheet 22 into engagement with the cable sheath. A small amount of cable is then withdrawn so as to move the cable drum slightly away from its extreme position and the cable is anchored to the washer. Thereafter, inflation of the bladder will pull the cable relative to the sheath and cause progressive unwinding of the cable from the cable drum with concomitant movement of the cable drum to increase the gap X.

In use, when the bladder is incorporated within a seat a user will typically sit in the seat and inflate the bladder from its fully deflated condition until a condition is reached which is deemed to be particularly comfortable. This position may be reached by inflating the bladder by addition of compressed air or, if the position optimum comfort is overshot, by bleeding air from the bladder. When a position of optimum comfort has been achieved a suitable control is operated to commit to memory the output of the sensor. This output of the sensor is characteristic of the particular configuration of the bladder at the moment when the output is recorded. If, subsequently, the vehicle in which the seat is fitted is left for some time with the result that air pressure leaks out of the bladder, the original preferred configuration of the bladder can automatically be re-established by using appropriate feedback circuitry to control the inflation pump in light of the output of the sensor. With such an arrangement, the bladder can be returned to exactly the physical configuration it previously adopted.

It is important to note that the system described above does not require any calibration since the sensor provides an output which is characteristic of the particular configuration of the bladder for the time being. Hence, if all that is desired is to re-establish particular configuration, all that is necessary is to re-create the sensor output corresponding to the desired configuration. The absolute value of this output is not critical. It is also to be noted that the device is effective to maintain the particular position regardless of changes which affect the properties of the bladder. Thus, for example, the desired configuration will be re-established even if this results in a higher or lower pressure within the bladder that was present when the output of the sensor was recorded, for example as a result of different temperature conditions.

It should be noted that although the illustrated cable drum 8 has a helical rib which, in use, guides the cable as it is wound onto the cable drum, the provision of such a rib is not necessary and the exterior surface of the cable drum may be of smooth cylindrical configuration.

What is claimed is:

1. A component position indicating apparatus for indicating when a first component is at the same position relative to a second component as it was at some historical reference time, comprising a cable connected to a first component, a sheath which surrounds part of the cable and is connected to the second component whereby relative movement between the first and the second components produces relative movement between the cable and the sheath, a chassis connected to the sheath, a cable drum rotatably mounted in the chassis, the cable being connected to the cable drum with some of the cable wrapped around the cable drum whereby linear movement of the cable relative to the cable sheath causes rotation of the cable drum within the chassis, and sensing means for providing an output characteristic of the position of the cable drum relative to the chassis.

2. A component position indicating apparatus according to claim 1, wherein said sensing means comprises a potentiometer, the resistance of which varies with the angular position of the cable drum relative to the chassis.

3. A component position indicating apparatus according to claim 2, wherein said potentiometer is of rotary design.

4. A component position indicating apparatus according to claim 2, wherein said potentiometer comprises a pair of arcuate contact tracks which are radially spaced apart and which are concentric with the axis of rotation of the cable drum, the cable drum having an electrical contact mounted thereon which engages said contact tracks so as to cause an electrical short therebetween, said electrical contact sweeping along said contact tracks upon rotation of the cable drum so as to vary the position of the short between said tracks and hence to vary their resistance such that each angular position of the cable drum produces a unique resistance across the contact tracks.

5. A component position indicating apparatus according to claim 4, wherein said contact tracks are printed on printed circuit board which is mounted on an endcap of the chassis.

6. A component position indicating apparatus according to claim 4, wherein each said contact track subtends an arc about the axis of rotation of the cable drum of at least 300 degrees.

7. A component position indicating apparatus according to claim 4, wherein said electrical contact is biased into engagement with said contact tracks.

8. A component position indicating apparatus according to claims 4, wherein a voltage is applied across said contact tracks at one end thereof and a voltmeter is connected across said tracks at the other end thereof which measures the output voltage.

9. A component position indicating apparatus according to claim 1, further including a screw-threaded support mounted on the chassis, the cable drum being screw threadedly mounted on the support whereby rotation of the cable drum causes rotation of the cable drum relative to the screw-threaded support and hence in linear movement of the cable drum relative to the chassis, and a sensor secured to the chassis for providing an output characteristic of the linear relative positions of the sensor and the cable drum.

10. A component position indicating apparatus according to claim 9, wherein said sensor is a hall effect sensor which reacts to the proximity of a magnet secured to the cable drum.

11. A component position indicating apparatus according to claim 1, further including spring means attached to the cable drum which biases said drum towards a first position relative to the chassis in which said cable is fully wound onto the cable drum.

12. A component position indicating apparatus according to claim 1, further including memory means associated with the sensing means which records said output characteristic when the first and second components have been adjusted to a desired position.

13. A component position indicating apparatus according to claim 1, further including drive means connected to the cable drum which is operable to rotate said cable drum into a predefined position corresponding with the first component adopting a defined preferred position relative to the second position.

14. A component position indicating apparatus according to claim 1, wherein the output characteristic of the sensing means varies continuously and in the same sense as said first and second components move from one limit of their relative positions to the opposite limit of their relative positions.

15. An inflation control system comprising an air cell having upper and lower sheets which define a first internal chamber, a second chamber located within and sealed off from said first chamber, the top of said second chamber being connected to the upper sheet and the bottom of said second chamber being connected to the lower sheet of said air cell, and said second chamber having upper and lower openings which connect said second chamber to the atmosphere, a cable which is firmly attached to the upper sheet of the air cell at said upper opening and which extends through said second chamber, out of said lower opening and connects to a component position indicating apparatus according to any of the preceding claims, said cable being freely translatable through said lower opening, and inflation means connected to said air cell for varying the pressure within said first chamber, wherein upon inflation of the first chamber, the upper opening of the second chamber moves away from the lower opening, drawing said cable with it, said movement of the cable being detected by the position indicating apparatus.

16. An inflation control system according to claim 15, wherein said second chamber is centrally located within said first chamber.

17. An inflation control system according to claim 15, wherein said first chamber is concentric with said second chamber and forms a toroid there around when the air cell is inflated.

18. An inflation control system according to claim 15, wherein the cable is anchored to the upper sheet of the air cell by means of a retaining washer.

19. An inflation control system according to claim 15, wherein the cable sheath through which the cable is freely translatably moveable abuts the outer surface of the lower sheet of the air cell at the lower opening.

20. An inflation control system according to claim 15, wherein the upper and lower sheets are substantially circular and are sealed together around their edges.

21. An inflation control system according to claim 15, wherein said second chamber is formed by a second pair of substantially circular upper and lower sheets which are sealed together around their edges.

* * * * *